(12) United States Patent
Jang et al.

(10) Patent No.: US 8,462,215 B2
(45) Date of Patent: Jun. 11, 2013

(54) PHOTOGRAPHING CONTROL METHOD AND APPARATUS ACCORDING TO MOTION OF DIGITAL PHOTOGRAPHING APPARATUS

(75) Inventors: Young-soo Jang, Suwon-si (KR); Sung Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 235 days.

(21) Appl. No.: 12/633,912

(22) Filed: Dec. 9, 2009

(65) Prior Publication Data

US 2010/0149353 A1 Jun. 17, 2010

(30) Foreign Application Priority Data

Dec. 11, 2008 (KR) .................. 10-2008-0125964

(51) Int. Cl.
*H04N 5/228* (2006.01)
(52) U.S. Cl.
USPC .................................................. 348/208.12
(58) Field of Classification Search
USPC ............... 348/208.12, 208.99, 208.2, 208.4, 348/208.11
See application file for complete search history.

(56) References Cited

U.S. PATENT DOCUMENTS

| 7,889,983 B2* | 2/2011 | Otsuka .......................... 396/55 |
| 2003/0030920 A1* | 2/2003 | Okawara ....................... 359/823 |
| 2007/0097219 A1* | 5/2007 | Nomura et al. ............. 348/208.7 |
| 2007/0122129 A1* | 5/2007 | Sakamoto et al. .............. 396/52 |

FOREIGN PATENT DOCUMENTS

| JP | 05-216087 A | 8/1993 |
| JP | 2005-251040 A | 8/2005 |
| KR | 1998-0031721 A | 7/1998 |
| KR | 1020060007792 A | 1/2006 |

* cited by examiner

*Primary Examiner* — James Hannett
(74) *Attorney, Agent, or Firm* — Drinker Biddle & Reath LLP

(57) ABSTRACT

Provided are a photographing control method and apparatus according to motion of a digital photographing apparatus. The photographing control method may prevent inconvenience when a subject is photographed while changing a viewing angle by using an additional zoom button, by sensing predetermined motion via a motion sensor comprised in the digital photographing apparatus and calculating a first motion value; comparing the calculated first motion value to predetermined threshold values; and controlling a zoom lens to be driven in a predetermined direction according to a result of the comparing.

21 Claims, 5 Drawing Sheets

PHOTOGRAPHING CONTROL METHOD AND APPARATUS ACCORDING TO MOTION OF DIGITAL PHOTOGRAPHING APPARATUS

CROSS-REFERENCE TO RELATED PATENT APPLICATION

This application claims the benefit of Korean Patent Application No. 10-2008-0125964, filed on Dec. 11, 2008, in the Korean Intellectual Property Office, the disclosure of which is incorporated herein in its entirety by reference.

BACKGROUND

The present invention relates to a photographing control method and apparatus, and more particularly, to a photographing control method and apparatus according to motion of a digital photographing apparatus.

Currently, zoom lenses are generally embedded in digital photographing apparatuses, such as digital cameras and camcorders. A subject may be photographed at various magnifications by using a zoom lens of a camera without changing positions of the subject or the camera; driving a zoom lens is referred to as "zooming".

Zooming is performed mostly to change a shot, to emphasize a specific subject, to create a dramatic mood, or to make an object clearer. An operation moving from a wide angle to a narrow angle is referred to as a zoom-in operation and an operation opposite to the zoom-in operation is referred to as a zoom-out or zoom-back operation.

However, conventional digital photographing apparatuses are inconvenient in that, in order to change a viewing angle when a subject is photographed, a zoom operation should be performed by using a specific button for changing the viewing angle, which is attached to a digital apparatus, or by rotating a lens in a specific direction.

Also, conventional digital cameras provide a function of photographing a subject regardless of any shaking of a digital camera along a direction parallel to an optical axis after the subject is focused. However, if a photographer is shaken forward and backward in the direction parallel to the optical axis during an exposure time of an imaging device after the subject is focused with a shallow depth of field, a failed picture can be obtained.

SUMMARY

The present invention provides a photographing control method and apparatus according to motion of a digital photographing apparatus, which are capable of controlling driving of a zoom lens and a focus lens according to the motion of the digital photographing apparatus held by a user.

The present invention also provides a recording medium having recorded thereon a computer program for executing the photographing control method.

According to an aspect of the present invention, there is provided a photographing control method according to motion of a digital photographing apparatus, the photographing control method including sensing predetermined motion via a motion sensor included in the digital photographing apparatus and calculating a first motion value; comparing the calculated first motion value to predetermined threshold values; and controlling a zoom lens to be driven in a predetermined direction according to a result of the comparing.

The threshold values may include first and second threshold values, and the first and second threshold values may be reference values which determine a direction of motion of the zoom lens.

The controlling may include controlling the zoom lens to be driven in a minus direction according to the first motion value if the first motion value is less than the first threshold value.

The controlling may include controlling the zoom lens to be driven in a plus direction according to the first motion value if the first motion value is greater than the second threshold value.

After the controlling, the photographing control method may further include sensing predetermined motion via the motion sensor and calculating a second motion value; comparing the calculated second motion value to predetermined threshold values; and controlling a focus lens to be driven in a predetermined direction according to a result of the comparing.

The threshold values may include third and fourth threshold values, and the third and fourth threshold values may be reference values which determine a direction of motion of the focus lens.

The controlling may include controlling the focus lens to be driven in a minus direction according to the second motion value if the second motion value is less than the third threshold value.

The controlling may include controlling the focus lens to be driven in a plus direction according to the second motion value if the second motion value is greater than the fourth threshold value.

The photographing control method may further include displaying that driving of the focus lens is completed.

After displaying that the driving of the focus lens is completed, the photographing control method may further include starting to expose an imaging device.

The motion sensor may be an acceleration sensor.

According to another aspect of the present invention, there is provided a photographing control apparatus according to motion of a digital photographing apparatus, the photographing control apparatus including a motion calculator that senses predetermined motion via a motion sensor included in the digital photographing apparatus and calculates a first motion value; and a controller that compares the calculated first motion value to predetermined threshold values and controls a zoom lens to be driven in a predetermined direction according to a result of the comparing.

The photographing control apparatus may further include a pattern storage which stores the threshold values, the threshold values may include first and second threshold values, and the first and second threshold values may be reference values which determine a direction of motion of the zoom lens.

The controller may contain algorithms for controlling the zoom lens to be driven in a minus direction according to the first motion value if the first motion value is less than the first threshold value.

The controller may contain algorithms for controlling the zoom lens to be driven in a plus direction according to the first motion value if the first motion value is greater than the second threshold value.

The motion calculator may contain algorithms for sensing predetermined motion via the motion sensor and calculates a second motion value, after completing driving of the zoom lens and starting to expose an imaging device, and the controller may contain algorithms for comparing the calculated second motion value to predetermined threshold values and controlling a focus lens to be driven in a predetermined direction according to a result of the comparing.

The pattern storage may further comprise stored third and fourth threshold values to be compared to the second motion value, and the third and fourth threshold values may be reference values which determine a direction of motion of the focus lens.

The controller may comprise algorithms for controlling the focus lens to be driven in a minus direction according to the second motion value if the second motion value is less than the third threshold value.

The controller may comprise algorithms for controlling the focus lens to be driven in a plus direction according to the second motion value if the second motion value is greater than the fourth threshold value.

According to another aspect of the present invention, there is provided a recording medium having recorded thereon a computer program for executing the photographing control method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described in detail by explaining embodiments of the invention with reference to the attached drawings. In the following description of the present invention, only essential parts for understanding operation of the present invention will be described and other parts may be omitted in order not to make the subject matter of the present invention unclear.

Also, the terms used in the specification and the claims should not be limited to conventional or lexical meanings and should be construed as having meanings and concepts corresponding to the technical idea of the present invention in order to the most appropriately describe the present invention.

Figure 1:
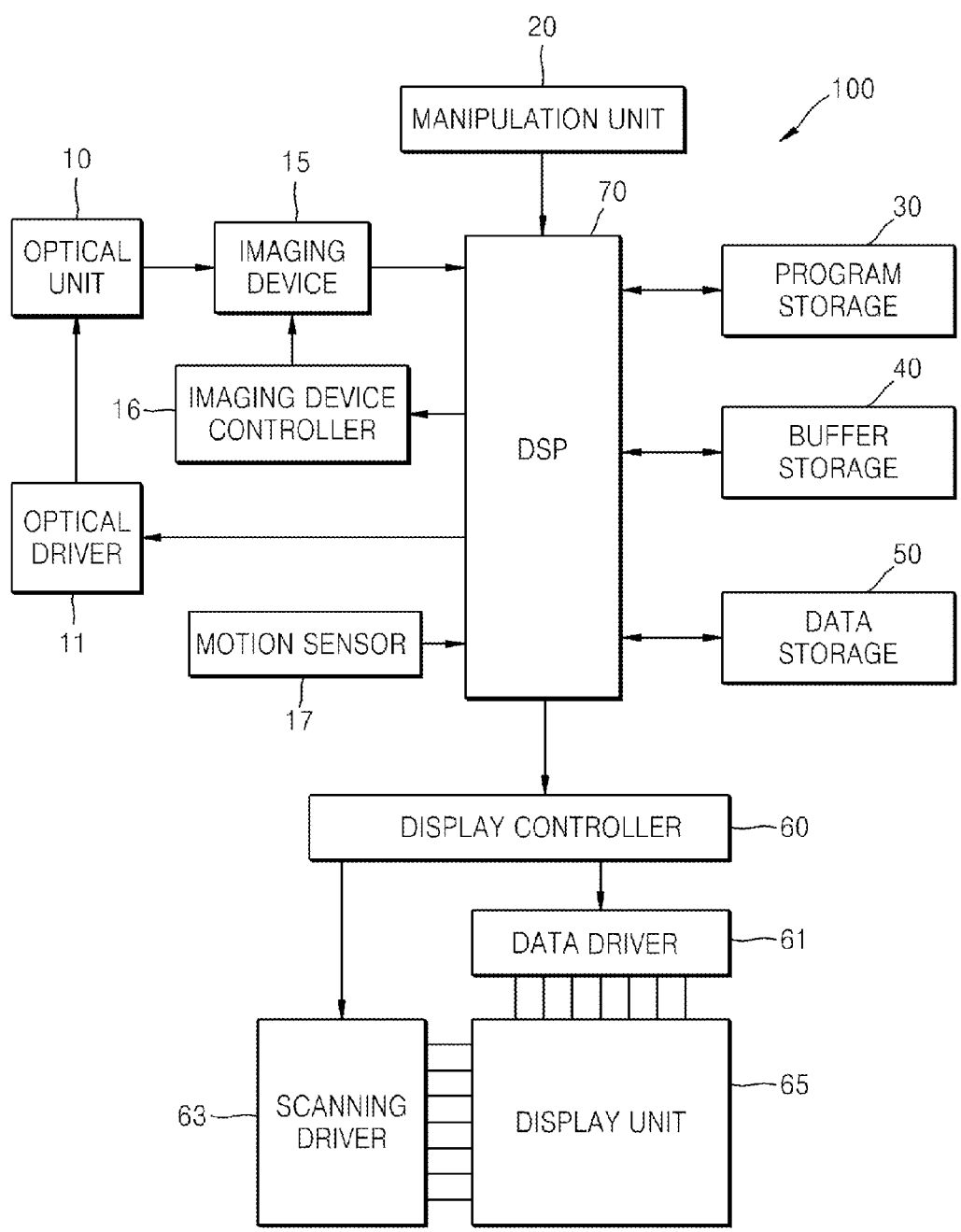
FIG. 1 is a block diagram of a digital photographing apparatus according to an embodiment of the present invention.
Figure 2:
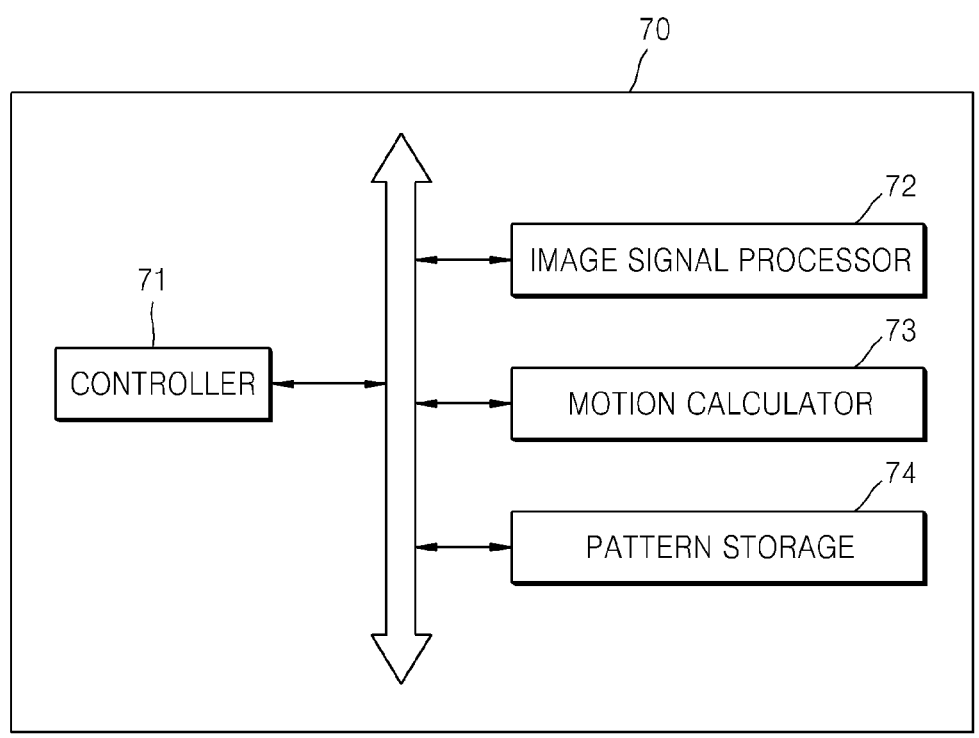
FIG. 2 is a block diagram of a digital signal processor (DSP) illustrated in FIG. 1.

FIG. 1 is a block diagram of a digital photographing apparatus 100 according to an embodiment of the present invention. FIG. 2 is a block diagram of a digital signal processor (DSP) 70 included in the digital photographing apparatus 100 illustrated in FIG. 1.

Referring to FIG. 1, the digital photographing apparatus 100 includes an optical unit 10, an optical driver 11, an imaging device 15, an imaging device controller 16, a motion sensor 17, a manipulation unit 20, a program storage 30, a buffer storage 40, a data storage 50, a display controller 60, a data driver 61, a scanning driver 63, a display unit 65, and the DSP 70.

The optical unit 10 receives an optical signal corresponding to a subject and provides the optical signal to the imaging device 15. The optical unit 10 includes a zoom lens that narrows or widens a viewing angle according to a focal length and a focus lens that focuses on the subject. Also, the optical unit 10 may further include an iris that controls an amount of light.

The optical driver 11 controls positioning of the zoom and focus lenses and opening of the iris. A zoom operation may be performed or the subject may be focused by positioning the zoom and focus lenses. Also, the amount of light may be controlled by controlling the opening of the iris. The optical driver 11 may control the optical unit 10 according to a control signal that is automatically generated in response to a real-time input image signal or a control signal that is manually input by a user's manipulation.

According to the current embodiment, the optical driver 11 drives the zoom lens and the focus lens according to a direction and a degree of motion of the digital photographing apparatus 100 held by the user under the control of the DSP 70 illustrated in FIG. 2. Here, the optical driver 11 may be a stepping motor or a direct current (DC) motor.

The optical signal that has passed through the optical unit 10 reaches a light-receiving surface of the imaging device 15 so as to form an image of the subject. The imaging device 15 may be a charge-coupled device (CCD) or a complementary metal oxide semiconductor image sensor (CIS), which converts an optical signal into an electric signal. The imaging device 15 parameters or attributes, for example, the sensitivity of the imaging device 15, may be controlled by the imaging device controller 16. The imaging device controller 16 may control the imaging device 15 according to a control signal that is automatically generated in response to a real-time input image signal or a control signal that is manually input by the user's manipulation.

The motion sensor 17 included in the digital photographing apparatus 100 senses the motion of the digital photographing apparatus 100 held by the user in an optical axis direction and provides a sensed signal to the DSP 70. Here, the motion sensor 17 may be an acceleration sensor. However, the motion sensor 17 is not limited thereto and other sensors that can sense the direction of the motion of the digital photographing apparatus 100 may also be used.

The motion sensor 17 senses acceleration in a forward/backward direction or the optical axis direction with reference to the optical unit 10 of the digital photographing apparatus 100, i.e., the zoom and focus lenses.

The manipulation unit 20 may receive a control signal input from outside the digital photographing apparatus 100, for example, by the user. The manipulation unit 20 includes various function buttons such as a shutter release button for taking a picture by exposing the imaging device 15 to light for a predetermined time, a power button for supplying power, text input buttons, a mode selection button for selecting a photographing mode or a reproducing mode, and setting buttons for setting white balance and exposure. Also, in the current embodiment, the user may drive the zoom and focus lenses according to the motion of the digital photographing apparatus 100 by selecting a photographing mode or a zoom/focus lens driving mode according to the motion of the digital photographing apparatus 100 by using the manipulation unit 20. Thus, the user may drive the zoom and focus lenses by only moving the digital photographing apparatus 100 without pressing wide-zoom and tele-zoom buttons for widening or narrowing the viewing angle according to an input.

Although the manipulation unit 20 may include the above-described various buttons, the present invention is not limited thereto. The manipulation unit 20 may be implemented in any form, such as a keyboard, a touch pad, or a remote controller, through which the user may input signals.

Also, the digital photographing apparatus 100 includes the program storage 30 for storing programs of, for example, operating and application systems that drive the digital photographing apparatus 100, the buffer storage 40 for temporarily storing data necessary for and result data of various operations, and the data storage 50 for storing various types of data necessary for the programs, for example, image files including image signals.

Furthermore, the digital photographing apparatus 100 includes the display controller 60 that controls to display an operation state of the digital photographing apparatus 100 and image data captured by the digital photographing apparatus 100, the data driver 61 and the scanning driver 63, which receive and transfer display data from the display controller 60, and the display unit 65 that displays a predetermined image according to signals input from the data driver 61 and the scanning driver 63. The display unit 65 may be formed of, for example, a liquid crystal display (LCD) panel, an organic light-emitting diode (OLED) panel, an electrophoretic display (EPD) panel, or the like.

In addition, the digital photographing apparatus 100 includes the DSP 70 that processes input image signals and controls other elements according to the input image signals or external input signals.

The DSP 70 will now be described in detail with reference to FIGS. 1 and 2.

Referring to FIGS. 1 and 2, the DSP 70 includes a controller 71, an image signal processor 72, a motion calculator 73, and a pattern storage 74. Here, the DSP 70 should be understood as a photographing control apparatus.

The controller 71 controls general operations of the DSP 70.

The image signal processor 72 converts an image signal input from the imaging device 15 into a digital image signal and performs image signal processes, such as gamma correction, color filter array interpolation, color matrix, color correction, and color enhancement, on the digital image signal in order to convert the digital image signal in a manner consistent with human vision. Also, the image signal processor 72 may perform an auto white balance algorithm or an auto exposure algorithm if functions corresponding to the algorithms are set. Furthermore, the image signal processor 72 controls image data size by using a scaler and generates an image file in a predetermined format by compressing the image data. Additionally, the image signal processor 72 may decompress the image file. The image signal processor 72 may perform the above-described image signal processes on an image signal that is input in real time in a live-view mode before photographing, or an image signal that is input in response to a shutter-release signal. In this case, different image signal processes may be performed on the image signals.

The motion calculator 73 senses motion via the motion sensor 17 included in the digital photographing apparatus 100 and calculates a motion value. The motion value may be calculated by calculating an increase in speed with respect to a signal generated by the motion sensor 17, for example, an inertial sensor, which represents the motion in a first axis of the digital photographing apparatus 100, i.e., an optical axis. The motion calculator 73 senses the motion of the digital photographing apparatus 100, which is made by a user for two purposes. One purpose is for driving a zoom lens and the other purpose is for performing manual focusing (MF) by driving a focus lens.

The motion calculator 73 senses a first motion for driving the zoom lens by the user and then senses a second motion of the digital photographing apparatus 100 after zooming is completely performed and a focusing completion mark is displayed. Thus, the first and second motions may be separately sensed based on a zooming completion signal or a focusing completion signal, under the control of the controller 71.

Also, zooming completion determination and focusing completion determination are described together in the current embodiment, but may also be independently implemented.

The pattern storage 74 stores predetermined threshold values used with regards to driving of the zoom lens or driving of the focus lens. Here, the pattern storage 74 may perform the same function as the buffer storage 40.

The pattern storage 74 stores reference values that may determine whether to move the zoom lens in a zoom-in direction, e.g., a plus direction, from a wide angle to a narrow angle and a zoom-out direction, e.g., a minus direction, from a narrow angle to a wide angle. For example, if the motion sensor 17 is an acceleration sensor, an acceleration value that may determine whether to move the zoom lens in the zoom-out direction is set and stored as a first threshold value and an acceleration value that may determine whether to move the zoom lens in the zoom-in direction is set and stored as a second threshold value. Such threshold values may be arbitrarily set.

Also, the pattern storage 74 stores reference values that may determine whether to move the focus lens in order to focus on a subject. Likewise, acceleration values that may determine whether to move the focus lens in the plus and minus directions are stored as third and fourth threshold values, respectively. That is, third and fourth threshold values are reference values that may determine whether the motion of the digital photographing apparatus 100 held by the user is in the plus direction or the minus direction of the focus lens, and may be arbitrarily set.

The controller 71 compares a first motion value calculated by the motion calculator 73 to a predetermined threshold value stored in the pattern storage 74 and controls the zoom lens to be driven in a predetermined direction according to a result of the comparison. If the first motion value is smaller than the first threshold value, the controller 71 controls the optical driver 11 to drive the zoom lens in the minus direction by the first motion value. That is, if the first motion value is smaller than the first threshold value (the reference value that may determine whether to move the zoom lens in the minus direction), the controller 71 determines that the motion of the digital photographing apparatus 100 held by the user is a zoom out motion. Thus, the zoom lens may be pulled and the subject may be photographed with a wide angle.

Also, if the first motion value is greater than the second threshold value (the reference value that may determine whether to move the zoom lens in the plus direction), the controller 71 determines that the motion of the digital photographing apparatus 100 held by the user is a zoom in motion. Thus, the zoom lens may be pushed and the subject may be photographed with a narrow angle.

The controller 71 compares a second motion value calculated by the motion calculator 73 to a predetermined threshold value stored in the pattern storage 74 and controls the zoom lens to be driven in a predetermined direction according to a comparison result. Here, the second motion value is a sensor signal value of the digital photographing apparatus 100 for driving the focus lens.

If the second motion value is smaller than the third threshold value (the reference value that may determine whether to move the focus lens in the minus direction), the controller 71 controls the focus lens to be driven in the minus direction according to the second motion value. If the second motion value is greater than the fourth threshold value (the reference value may determine whether to move the focus lens in the plus direction), the controller 71 controls the focus lens to be driven in the plus direction according to the second motion value.

Figure 3A:
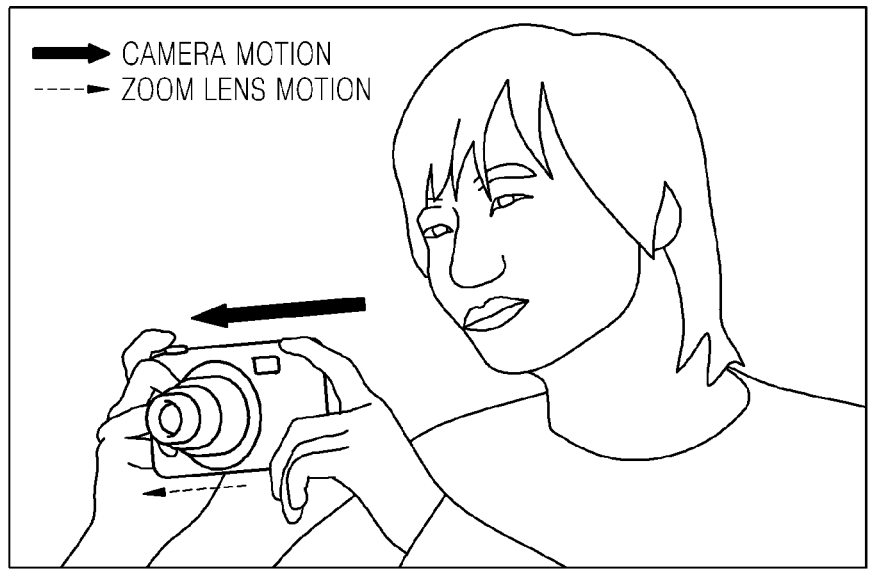
FIGS. 3A and 3B are pictorial images for describing a direction of motion of a zoom lens according to motion of a digital photographing apparatus, according to an embodiment of the present invention.
Figure 3B:
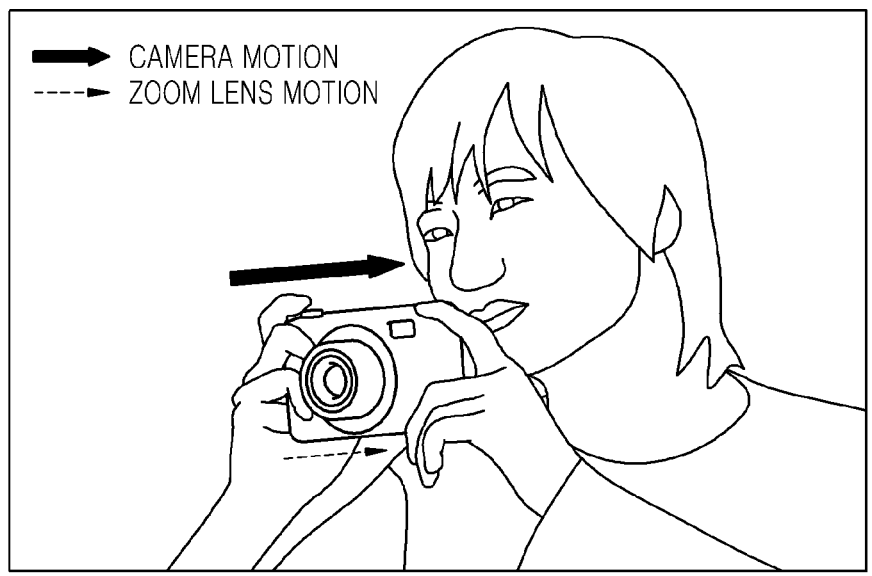

FIGS. 3A and 3B are images for describing a direction of motion of a zoom lens according to motion of a digital photographing apparatus, according to an embodiment of the present invention.

Referring to FIGS. 3A and 3B, FIG. 3A shows a case when a user desires to photograph a subject with a narrow angle and moves the digital photographing apparatus held by the user, e.g., a digital camera, in a direction toward the subject (i.e., a plus direction), and thus the zoom lens moves in a zoom-in direction.

On the other hand, FIG. 3B shows a case when the user moves the digital photographing apparatus held by the user in a direction toward the user (i.e., a minus direction), and thus the zoom lens moves in a zoom-out direction. Although not shown in FIGS. 3A and 3B, a driving speed of the zoom lens may be controlled to be great or small according to a speed of moving the digital photographing apparatus.

Although the zoom-in direction is described as the plus direction and the zoom-out direction is described as the minus direction in FIGS. 3A and 3B, the plus and minus directions may be inversely set.

Figure 4:
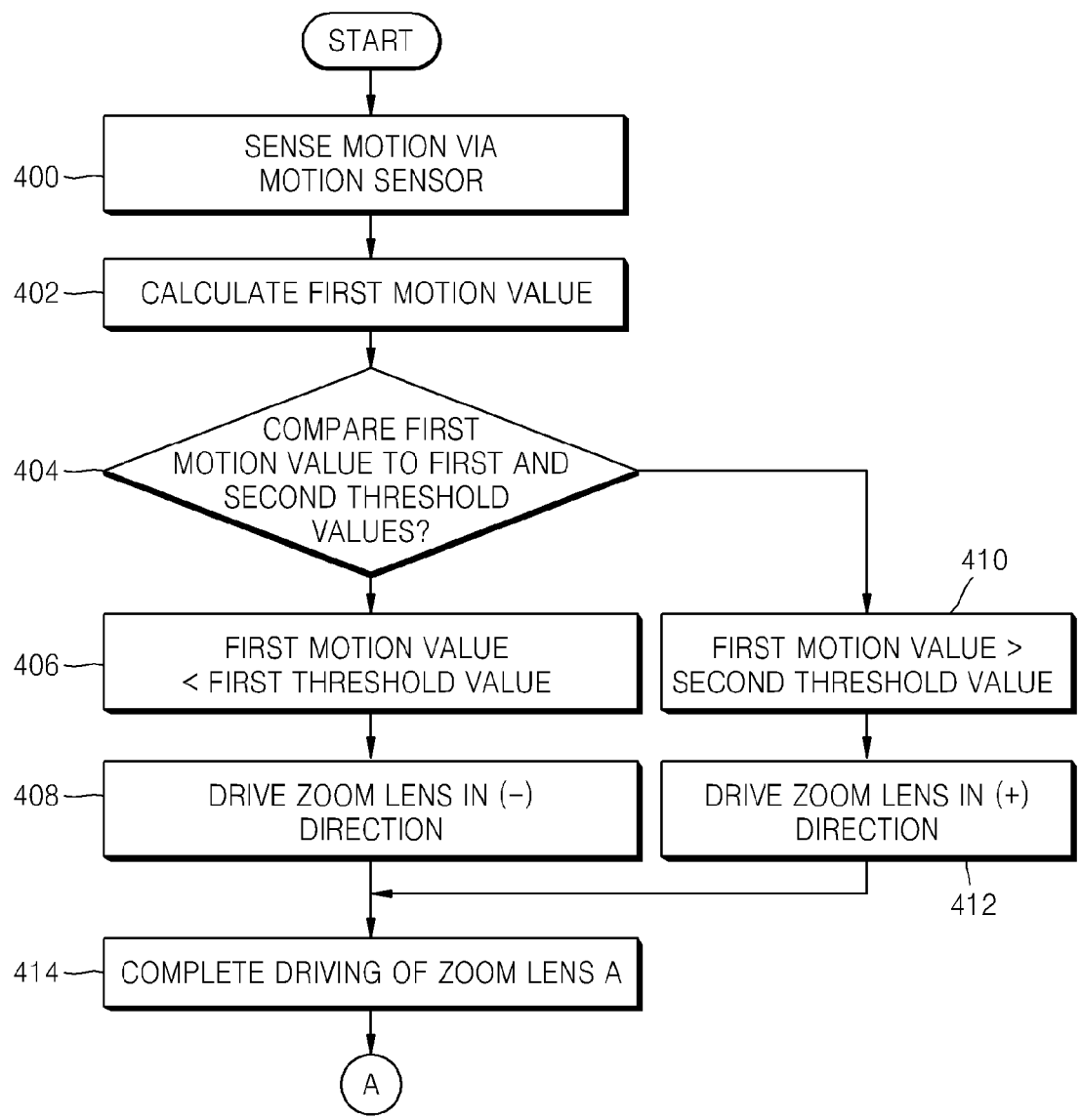
FIG. 4 is a flowchart of a photographing control method according to motion of a digital photographing apparatus, according to an embodiment of the present invention.

FIG. 4 is a flowchart of a photographing control method according to motion of a digital photographing apparatus, according to an embodiment of the present invention.

Referring to FIG. 4, in operation 400, the motion is sensed via a motion sensor. In operation 402, a first motion value is calculated according to a signal of the sensed motion. In operation 404, the first motion value is compared to previously stored first and second threshold values.

If it is determined that the first motion value is smaller than the first threshold value in operation 404, in operations 406 and 408, a zoom lens is driven in a minus direction. If it is determined that the first motion value is greater than the second threshold value in operation 404, in operations 410 and 412, the zoom lens is driven in a plus direction.

In operation 414, driving of the zoom lens is completed.

Figure 5:
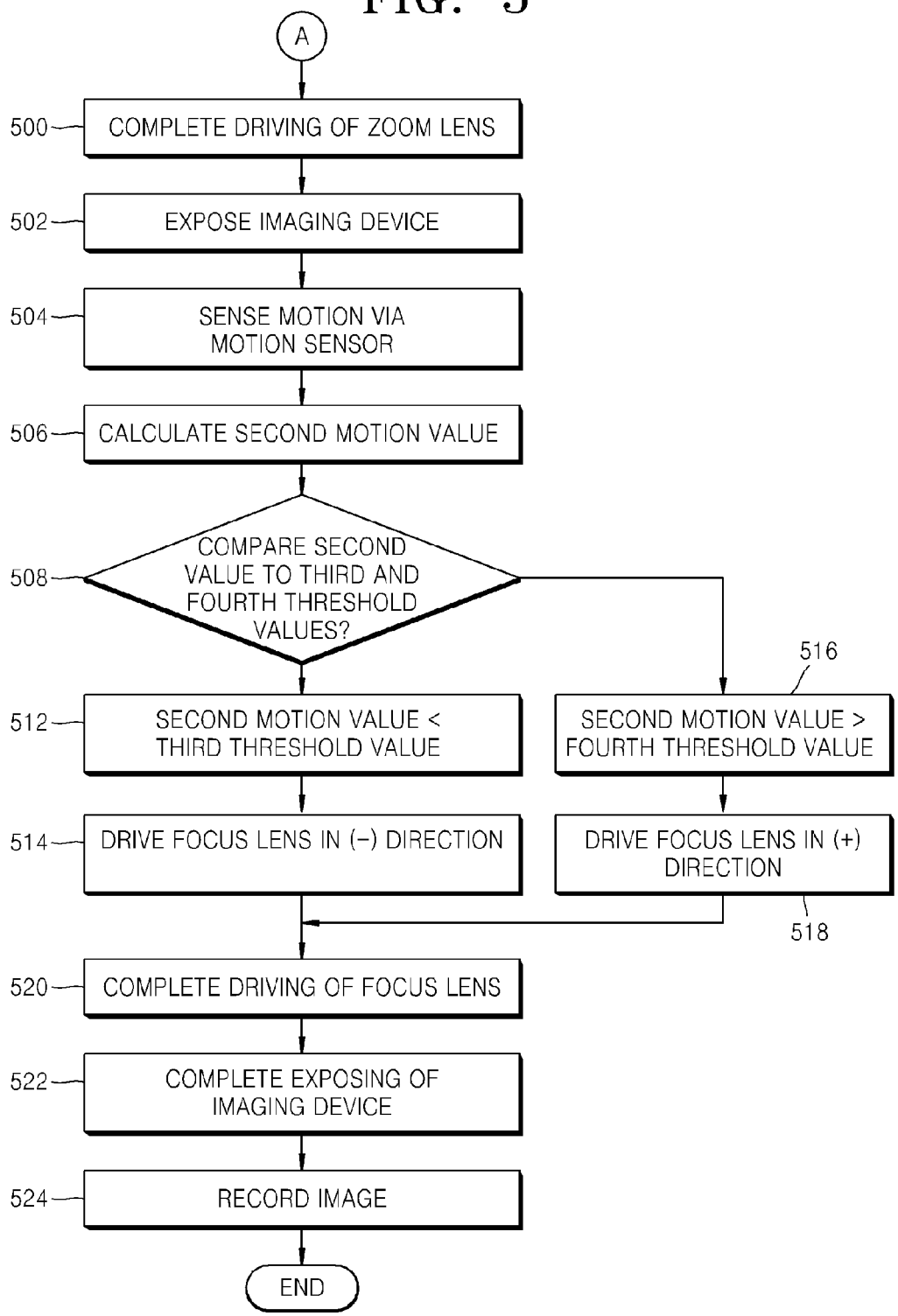
FIG. 5 is a flowchart of a photographing control method according to motion of a digital photographing apparatus, according to another embodiment of the present invention.

FIG. 5 is a flowchart of a photographing control method according to motion of a digital photographing apparatus, according to another embodiment of the present invention.

Referring to FIG. 5, in operation 500, driving of a focus lens is completed. That is, after driving of a zoom lens is completed by using the photographing control method illustrated in FIG. 4, moving of the focus lens is completed by performing auto focusing according to a distance from a subject.

In operation 502, an imaging device is exposed and, in operation 504, the motion is sensed via a motion sensor. In operation 506, a second motion value is calculated. In operation 508, the second motion value is compared to third and fourth threshold values.

If it is determined that the second motion value is smaller than the third threshold value in operation 508, in operations 512 and 514, the focus lens is driven in a minus direction. If it is determined that the second motion value is greater than the fourth threshold value in operation 508, in operations 516 and 518, the focus lens is driven in a plus direction.

In operation 520, the driving of the focus lens is completed and, in operation 522, exposing of the imaging device is completed. In operation 524, the subject is photographed and recorded as the user presses a shutter release button.

The driving of the focus lens, which is illustrated in FIG. 5, is described in conjunction with the driving of the zoom lens, which is illustrated in FIG. 4. However, a manual focusing operation according to the motion of the digital photographing apparatus is included in the scope of the present invention.

Although the above embodiments of the present invention are described based on a digital camera as an example of a digital photographing apparatus, the present invention is not limited thereto. It will be understood by one of ordinary skill in the art that the present invention may be applied to mobile phones, personal digital assistants (PDAs), and portable multimedia players (PMPs), which have camera functions.

The invention can also be embodied as computer readable codes on a computer readable recording medium. The computer readable recording medium is any data storage device that can store data that can be thereafter read by a computer system. This media can be read by the computer, stored in the memory, and executed by the processor.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to the present invention, inconvenience caused when a subject is photographed while changing a viewing angle by using an additional zoom button may be solved by driving a zoom lens according to motion of a digital photographing apparatus held by a user.

Also, if a subject is focused with a shallow depth of field, a problem caused by shaking of the user in an optical axis direction may be solved even when focusing is completed.

All references, including publications, patent applications, and patents, cited herein are hereby incorporated by reference to the same extent as if each reference were individually and specifically indicated to be incorporated by reference and were set forth in its entirety herein.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A photographing control method according to motion of a digital photographing apparatus, the photographing control method comprising:
   (a) sensing motion which is parallel to an optical axis of the digital photographing apparatus via a motion sensor comprised in the digital photographing apparatus that directly measures motion parallel to the optical axis, and calculating a first motion value representing the sensed motion;
   (b) comparing the calculated first motion value to predetermined threshold values; and
   (c) controlling a zoom lens to be driven in a direction which is parallel to the optical axis to have a wider or narrower viewing angle according to a result of the comparing.

2. The photographing control method of claim 1, wherein:
   the threshold values comprise first and second threshold values; and
   the first and second threshold values are reference values which determine the direction of motion of the zoom lens.

3. The photographing control method of claim 2, wherein step (c) comprises controlling the zoom lens to be driven in a minus direction according to the first motion value if the first motion value is less than the first threshold value.

4. The photographing control method of claim 3, wherein step (c) comprises controlling the zoom lens to be driven in a plus direction according to the first motion value if the first motion value is greater than the second threshold value.

5. The photographing control method of claim 1, the method further comprising, after performing step (c):
   (d) sensing second motion via the motion sensor and calculating a second motion value representing the second sensed motion;
   (e) comparing the calculated second motion value to second predetermined threshold values; and
   (f) controlling a focus lens to be driven in a second direction according to a result of the comparing.

6. The photographing control method of claim 5, wherein:
   the second predetermined threshold values in step (e) comprises third and fourth threshold values; and
   the third and fourth threshold values are reference values which determine the second direction of motion of the focus lens.

7. The photographing control method of claim 6, wherein step (f) comprises controlling the focus lens to be driven in a minus direction according to the second motion value if the second motion value is less than the third threshold value.

8. The photographing control method of claim 7, wherein step (f) comprises controlling the focus lens to be driven in a plus direction according to the second motion value if the second motion value is greater than the fourth threshold value.

9. The photographing control method of claim 5, further comprising, before performing step (d), displaying that driving of the focus lens is completed.

10. The photographing control method of claim 9, further comprising, after displaying that the driving of the focus lens is completed, starting to expose an imaging device.

11. The photographing control method of claim 1, wherein the motion sensor is an acceleration sensor.

12. A non-transitory recording medium having recorded thereon a computer program for executing a photographing control method comprising:
   (a) sensing motion which is parallel to an optical axis of the digital photographing apparatus via a motion sensor comprised in the digital photographing apparatus that directly measures motion parallel to the optical axis, and calculating a first motion value representing the sensed motion;
   (b) comparing the calculated first motion value to predetermined threshold values; and
   (c) controlling a zoom lens to be driven in a direction which is parallel to the optical axis to have a wider or narrower viewing angle according to a result of the comparing.

13. A photographing control apparatus according to motion of a digital photographing apparatus, the photographing control apparatus comprising:
   a motion calculator that senses motion which is parallel to an optical axis of the digital photographing apparatus via a motion sensor comprised in the digital photographing apparatus that directly measures motion parallel to the optical axis, and calculates a first motion value representing the sensed motion; and
   a controller that compares the calculated first motion value to predetermined threshold values and controls a zoom lens to be driven in a direction which is parallel to the optical axis apparatus to have a wider or narrower viewing angle according to a result of the comparing.

14. The photographing control apparatus of claim 13, further comprising:
   a pattern storage which stores the threshold values;
   wherein:
   the predetermined threshold values comprise first and second threshold values; and
   the first and second threshold values are reference values that determine the direction of motion of the zoom lens.

15. The photographing control apparatus of claim 14, wherein the controller controls the zoom lens to be driven in a minus direction according to the first motion value if the first motion value is less than the first threshold value.

16. The photographing control apparatus of claim 15, wherein the controller controls the zoom lens to be driven in a plus direction according to the first motion value if the first motion value is greater than the second threshold value.

17. The photographing control apparatus of claim 14, wherein:
- the motion calculator senses second motion via the motion sensor and calculates a second motion value representing the second sensed motion, after completing driving of the zoom lens and starting to expose an imaging device; and
- the controller compares the calculated second motion value to second predetermined threshold values and controls a focus lens to be driven in a second direction according to a result of the comparing.

18. The photographing control apparatus of claim 17, wherein:
- the pattern storage further stores third and fourth threshold values to be compared to the second motion value; and
- the third and fourth threshold values are reference values that determine the second direction of motion of the focus lens.

19. The photographing control apparatus of claim 18, wherein the controller controls the focus lens to be driven in a minus direction according to the second motion value if the second motion value is less than the third threshold value.

20. The photographing control apparatus of claim 19, wherein the controller controls the focus lens to be driven in a plus direction according to the second motion value if the second motion value is greater than the fourth threshold value.

21. A photographing control method according to motion of a digital photographing apparatus, the photographing control method comprising:
- (a) directly sensing motion in a direction parallel to an optical axis via a motion sensor comprised in the digital photographing apparatus that directly measures motion parallel to the optical axis, and calculating a first motion value representing the sensed motion;
- (b) comparing the calculated first motion value to predetermined threshold values; and
- (c) controlling a zoom lens to be driven in a direction which is parallel to the optical axis according to a result of the comparing.

* * * * *